United States Patent
Ishii

(10) Patent No.: US 9,487,023 B2
(45) Date of Patent: Nov. 8, 2016

(54) TAPE PRINTER AND RECORDING MEDIUM CONFIGURED TO REDUCE PRINT OBJECT SIZE WHEN SPECIFIED SIZE IS IMPOSSIBLE TO PRINT

(71) Applicant: Brother Kogyo Kabushiki Kaisha, Nagoya-shi, Aichi-ken (JP)

(72) Inventor: Hidekazu Ishii, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/870,097

(22) Filed: Sep. 30, 2015

(65) Prior Publication Data

US 2016/0107453 A1 Apr. 21, 2016

(30) Foreign Application Priority Data

Oct. 17, 2014 (JP) .................................. 2014-212901

(51) Int. Cl.
  *G06F 3/12* (2006.01)
  *G06F 17/21* (2006.01)
  *B41J 3/407* (2006.01)

(52) U.S. Cl.
  CPC ............ *B41J 3/4075* (2013.01); *G06F 17/211* (2013.01)

(58) Field of Classification Search
  CPC ............................ B41J 2/40753; B41J 3/4075
  See application file for complete search history.

(56) References Cited

U.S. PATENT DOCUMENTS

| 2005/0281599 | A1* | 12/2005 | Akaiwa | B41J 3/32 400/76 |
| 2008/0014001 | A1* | 1/2008 | Horii | B41J 3/4075 400/67 |
| 2008/0181702 | A1* | 7/2008 | Suzuki | B41J 3/4075 400/61 |
| 2009/0244603 | A1 | 10/2009 | Fukutani et al. | |
| 2013/0070261 | A1* | 3/2013 | Kimura | B41J 3/46 358/1.2 |

FOREIGN PATENT DOCUMENTS

JP  2009233884 A  10/2009
JP  2013136207 A * 7/2013

* cited by examiner

*Primary Examiner* — Daniel J Colilla
(74) *Attorney, Agent, or Firm* — Banner & Witcoff, Ltd.

(57) ABSTRACT

The disclosure discloses a tape printer includes a controller configured to execute a tape width acquiring process, an object acquiring process, a first specification receiving process, a determining process, and a first reduction process. In the object acquiring process, a first and a second print object to be formed on a first or a second line of the print-receiving tape, are acquired. In the first specification receiving process, specifications of a first and a second size are received. In the determining process, it is determined whether or not a print of the first and the second print object can be performed according to each of the specified sizes and the tape width of the print-receiving tape. In the first reduction process, at least one of the first and the second print object is reduced in accordance with a magnification rule so that the print of the first and the second print object becomes possible.

17 Claims, 6 Drawing Sheets

TAPE PRINTER AND RECORDING MEDIUM CONFIGURED TO REDUCE PRINT OBJECT SIZE WHEN SPECIFIED SIZE IS IMPOSSIBLE TO PRINT

CROSS-REFERENCE TO RELATED APPLICATION

The present application claims priority from Japanese Patent Application No. 2014-212901, which was filed on Oct. 17, 2014, the disclosure of which is incorporated herein by reference in its entirety.

BACKGROUND

1. Field

The present disclosure relates to a tape printer and a recording medium that form desired print.

2. Description of the Related Art

There are known tape printers that form desired print on a print-receiving tape. In the tape printer (tape printing device) of this prior art, desired print is formed on the print-receiving tape (tape) supplied from a tape cartridge (tape cassette) mounted to a cartridge holder (cassette storage part). At this time, an operator can specify a size of a desired print object that he or she intends to form into print.

In the tape printer of the prior art above, a width of the print-receiving tape supplied from the mounted tape cartridge may be relatively narrow when various tape cartridges are mounted to the cartridge holder and used. In such as a case, when the size of the print object specified by the operator is relatively large, it becomes difficult to form the print object with that size on the print-receiving tape. In particular, if print objects spanning multiple lines are to be formed in a tape width direction, the possibility exists that the width of the print-receiving tape will be inadequate, making print formation impossible.

SUMMARY

It is therefore an object of the present disclosure to provide a tape printer and a recording medium on which is stored a print display program used in the tape printer, capable of reliably forming print objects spanning multiple lines, even if the width of the print-receiving tape is relatively narrow.

In order to achieve the above-described object, according to an aspect of the present application, there is provided a tape printer comprising a feeder configured to feed a print-receiving tape, a printing head configured to form desired print on the print-receiving tape fed by the feeder, a cartridge holder configured to attach and detach a tape cartridge configured to supply the print-receiving tape, and a controller configured to control the feeder and the printing head, the controller being configured to execute a tape width acquiring process for acquiring a tape width of the print-receiving tape disposed in the tape cartridge mounted to the cartridge holder, an object acquiring process for acquiring a first print object to be formed on a first line of the print-receiving tape in a tape width direction, and a second print object to be formed on a second line of the print-receiving tape in the tape width direction, a first specification receiving process for respectively receiving a specification of a first size when the first print object is printed, and a specification of a second size having a value that is different from a value of the first size when the second print object is printed, a determining process for determining whether or not a print of the first print object and the second print object can be performed according to each of the specified sizes on the print-receiving tape, based on the specifications of the first size and the second size received by the first specification receiving process, and the tape width of the print-receiving tape acquired by the tape width acquiring process, and a first reduction process for reducing at least one of the first print object and the second print object in accordance with at least one preset magnification rule so that the print of the first print object and the second print object becomes possible in a case where the print according to the specified sizes is determined to be impossible by the determining process.

DETAILED DESCRIPTION OF THE PREFERRED EMBODIMENTS

The following describes an embodiment of the present disclosure with reference to accompanying drawings.

Figure 1:
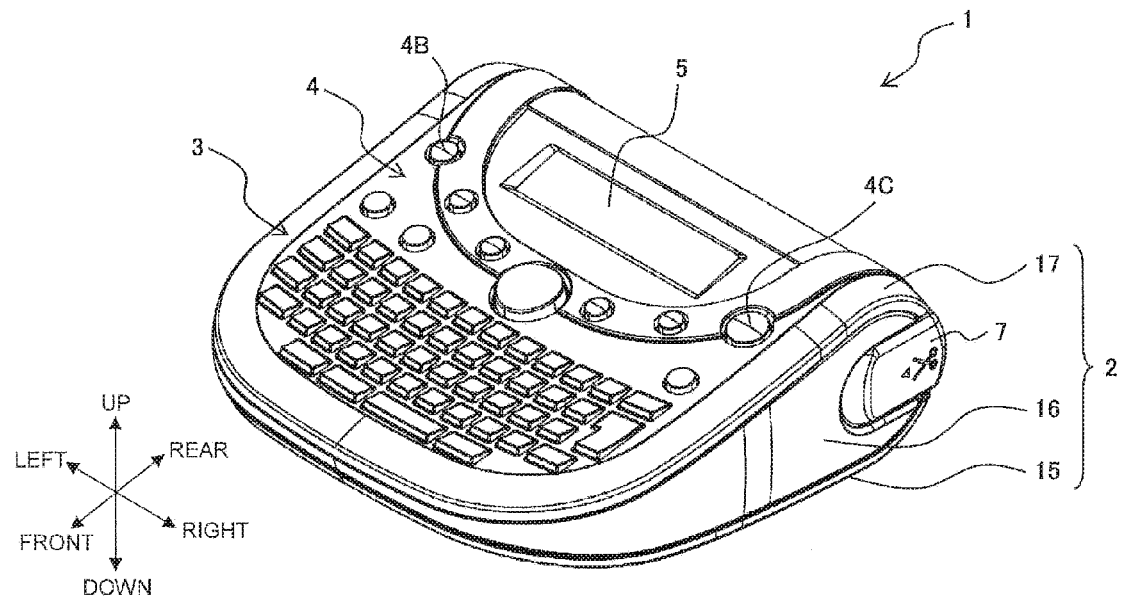
FIG. 1 is a perspective view showing the outer appearance of the tape printer in an embodiment of the present disclosure, as viewed obliquely from above.
Figure 2:
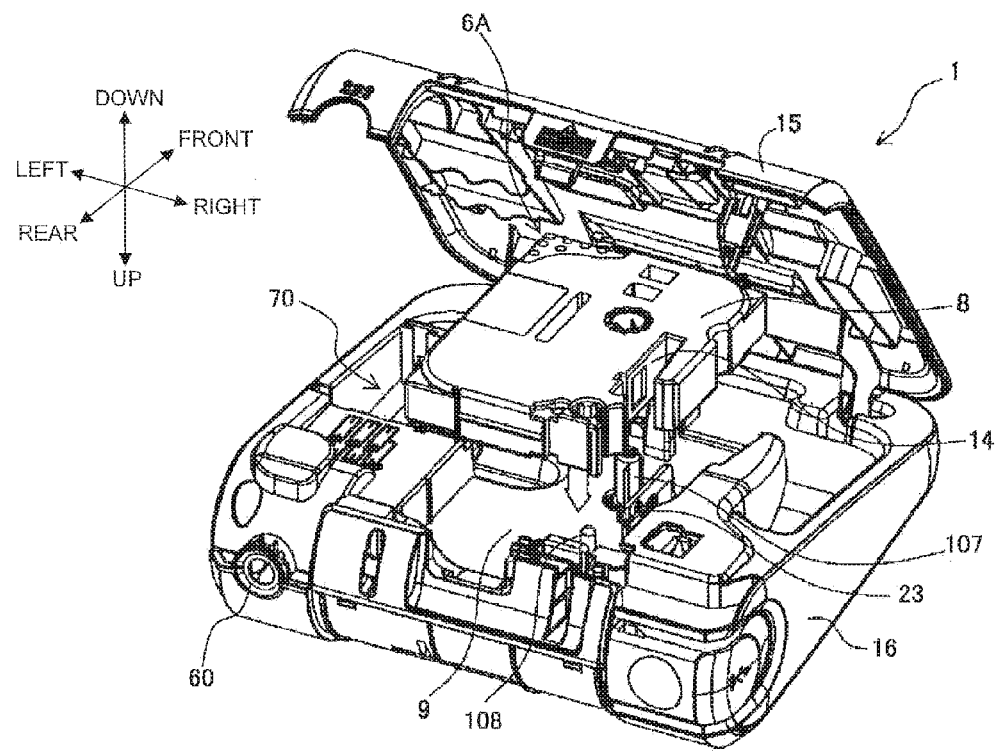
FIG. 2 is a perspective view showing the outer appearance of the tape printer with the lower cover open, as viewed obliquely from below.

The general configuration of the tape printer in this embodiment will be described using FIGS. 1-3. In FIG. 1, a tape printer 1 produces a print label L (refer to FIG. 5, FIG. 6, and the like described later) by cutting a label tape with print on which desired printing was performed at a predetermined length. Note that the terms front, rear, left, right, up, and down of the tape printer 1 in this embodiment indicate the directions shown in FIG. 1, FIG. 2, and the like. General Overall Configuration As shown in FIG. 1 and FIG. 2, a housing 2 of the tape printer 1 includes a lower cover 15 constituting the device lower surface, a side cover 16 constituting the device side surface, and an upper cover 17 constituting the device upper surface. A keyboard 3 by which various operations, such as character input and the like, are performed, a function key group 4 for executing various functions of the tape printer 1, and a liquid crystal display 5 for displaying input characters, symbols, and the like, are disposed on the upper cover 17, from the front toward the rear. Four cursor keys "↑" "←" "→" "↓" as well as regular letter and number keys, for example, are disposed on the keyboard 3. The function key group 4, in this example, includes a power switch 4B, a print key 4C, and the like. Further, a cutter lever 7 for cutting a printed label tape 109 with print (refer to FIG. 3 described later) is disposed on the right rear of the side cover 16.

A cartridge holder 9 capable of attaching and detaching a cartridge 8 is disposed on the upper rear of the tape printer 1. This cartridge holder 9 is covered when the above described lower cover 15 configured in an openable and closeable manner with a front end of the tape printer 1 serving as the axis of rotation is closed, and is exposed when the lower cover 15 is opened.

Further, as shown in FIG. 2, a battery storage part 70 capable of storing a plurality of batteries BT (refer to FIG. 4 described later) is disposed adjacent to the cartridge holder 9, on the upper rear of the tape printer 1. Note that, in FIG. 2, reference number 60 denotes a DC jack to which an output plug of an AC adapter 220 (refer to FIG. 4 described later) serving as an external power source is connected.

Cartridge

Figure 3:
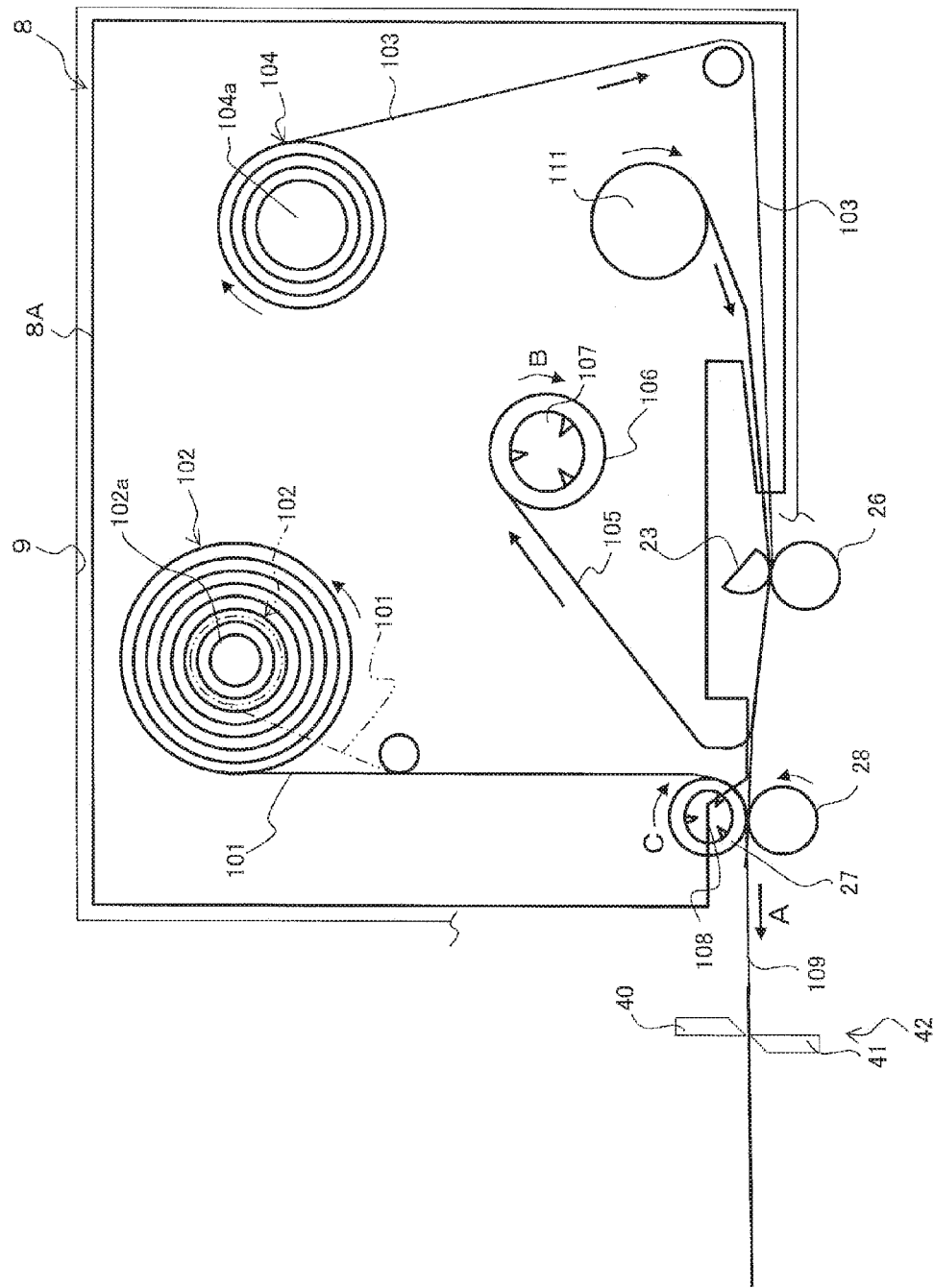
FIG. 3 is an enlarged plan view schematically showing the inner structure of the cartridge.

As shown in FIG. 3, the cartridge 8 comprises a housing 8A, a first roll 102 (actually spiral in shape, but simply shown in a concentric shape in the figure) around which is wound a strip base tape 101, disposed inside this housing 8A, a second roll 104 (actually spiral in shape, but simply shown in a concentric shape in the figure) around which is wound a transparent cover film 103, having substantially the same width as the above described base tape 101, a ribbon supply side roll 111 that feeds out an ink ribbon 105 (heat transfer printing ribbon, which is not required if the print-receiving tape is a thermal tape), a ribbon take-up roller 106 that takes up the ink ribbon 105 after printing, and a feeding roller 27 rotatably supported near a tape discharging part of the cartridge 8. Further, a detected part 6A (refer to FIG. 2 described above) that is detected by a cartridge sensor 6 (refer to FIG. 4 described later) disposed on the housing 2 of the tape printer 1 when the cartridge 8 is mounted to the cartridge holder 9 is disposed on the housing 8A, for example, of the cartridge 8.

The feeding roller 27 feeds the tape in the direction indicated by an arrow A in FIG. 3 while pressing and adhering the above described base tape 101 and the above described cover film 103 to each other and establishing the label tape 109 with print.

In the first roll 102, the above described base tape 101 is wound around a reel member 102a. Although not shown in detail, the base tape 101 has a four-layer structure in this example, comprising a bonding adhesive layer made of a suitable adhesive, a colored base film made of polyethylene terephthalate (PET) or the like, an affixing adhesive layer made of a suitable adhesive, and a separation sheet, which are layered in that order from the side rolled to the inside toward the opposite side.

In the second roll 104, the above described cover film 103 is wound around a reel member 104a. The ink ribbon 105 is pressed by and made to contact a thermal head 23 on the back surface of the cover film 103 fed out from the second roll 104.

At this time, in accordance with the above described configuration of the cartridge 8, a ribbon take-up shaft 107 for taking up the above described used ink ribbon 105, and a feeding roller driving shaft 108 for driving the above described feeding roller 27 for feeding the label tape 109 with print are disposed on the cartridge holder 9. Further, the above described thermal head 23 that performs desired printing on the cover film 103 is disposed on the cartridge holder 9 so as to be positioned at an opening 14 (refer to FIG. 2) of the cartridge 8 when the cartridge 8 is mounted. Note that the thermal head 23 comprises a plurality of heating elements (not shown) arranged in a tape width direction of the cover film 103. That is, the thermal head 23 is disposed so that the tape width direction of the above described cover film 103 faces the above described plurality of heating elements.

The ribbon take-up roller 106 and the feeding roller 27 are mutually rotationally driven in coordination by a driving force of a drive motor 211 (refer to FIG. 4 described later), which is a pulse motor, for example, disposed on an outside of the cartridge 8, that is transmitted to the above described ribbon take-up roller driving shaft 107 and the above described feeding roller driving shaft 108 via a gear mechanism (not shown).

In the above described configuration, when the cartridge 8 is mounted to the above described cartridge holder 9 and a roll holder is moved from a release position (not shown) to a printing position shown in FIG. 3, the cover film 103 and the ink ribbon 105 are held between the above described thermal head 23 and a platen roller 26 disposed facing this thermal head 23. With this, the base tape 101 and the cover film 103 are held between the feeding roller 27 and a pressure roller 28 disposed facing the feeding roller 27. Then, the ribbon take-up roller 106 and the feeding roller 27 are each synchronously rotationally driven in directions indicated by an arrow B and an arrow C in FIG. 3, by the driving force of the above described drive motor. At this time, the aforementioned feeding roller driving shaft 108, the above described pressure roller 28, and the platen roller 26 are connected to one another by a gear mechanism (not shown). With the arrangement, with the driving of the feeding roller driving shaft 108, the feeding roller 27, the pressure roller 28, and the platen roller 26 rotate, thereby feeding out and supplying the base tape 101 from the first roll 102 to the feeding roller 27 as previously described.

Meanwhile, the cover film 103 is fed out from the second roll 104, and the above described plurality of heating elements disposed on the thermal head 23 is energized to generate heat by a thermal head control circuit 217 (refer to FIG. 4 described later). At this time, the ink ribbon 105 driven by the ribbon take-up roller 106 is pressed by and made to contact the above described thermal head 23 on a back surface side of the cover film 103 (that is, the side to be adhered with the above described base tape). As a result, print (details described later) resulting from dot formation corresponding to print data of desired print content is printed on the back surface of the cover film 103.

Then, the above described base tape 101 and the above described cover film 103 on which the printing is completed are adhered and integrated by the pressing of the above described feeding roller 27 and the pressure roller 28 and by the above described bonding adhesive layer, thereby forming the label tape 109 with print, which is then discharged to the outside of the cartridge 8. The ink ribbon 105, with which printing on the cover film 103 was completed, is taken up by the ribbon take-up roller 106 by the driving of the ribbon take-up roller driving shaft 107.

A cutting mechanism 42 comprising a fixed blade 40 and a moveable blade 41 is disposed on a downstream side of a transport path of the label tape 109 with print discharged to the outside of the cartridge 8. The movable blade 41 operates when the above described cutter lever 7 is activated, cutting the above described label tape 109 with print and generating the print label L (refer to FIG. 5, FIG. 6, and the like described later).

Control System

Next, the control system of the tape printer 1 will be described using FIG. 4.

Figure 4:
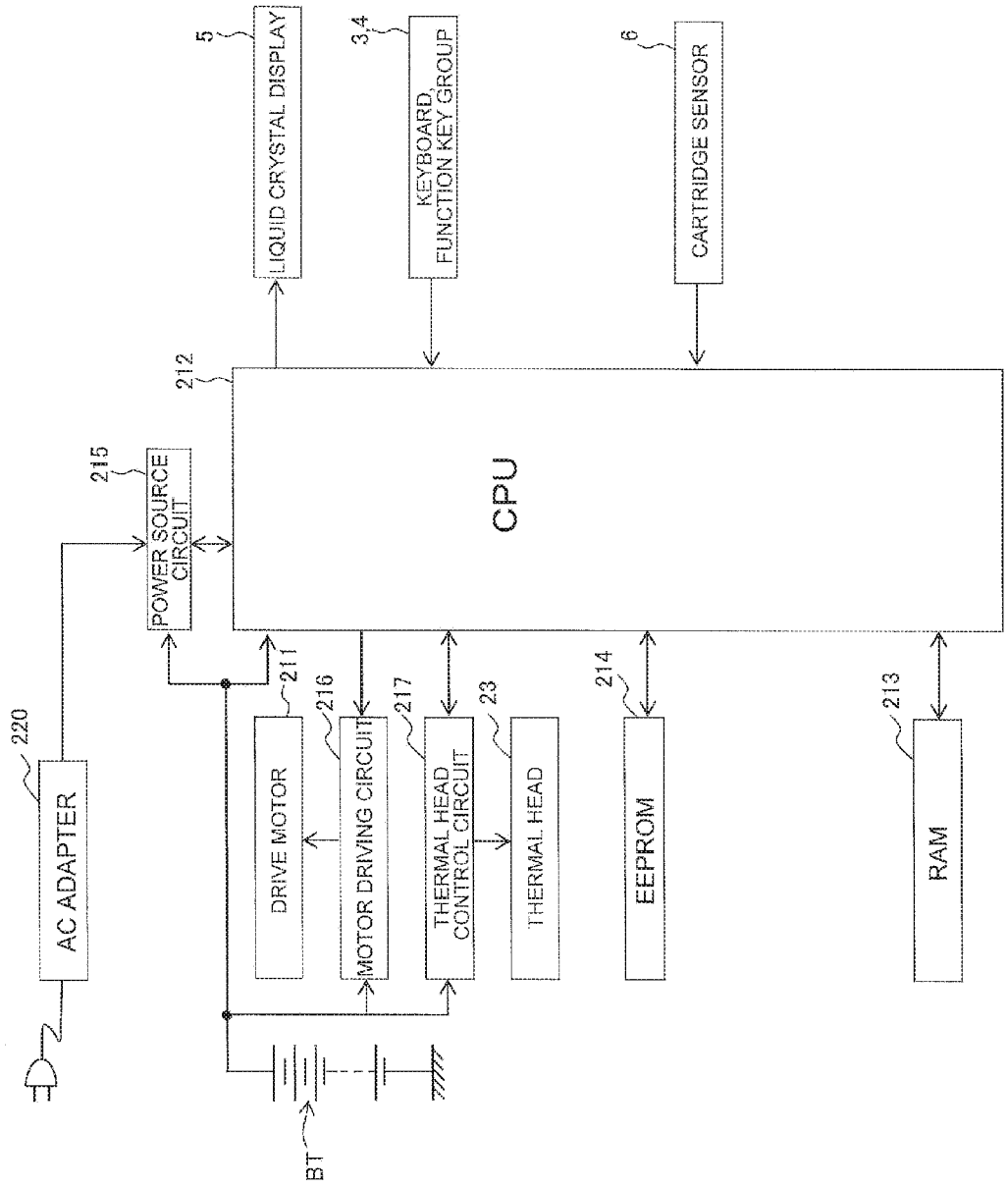
FIG. 4 is a functional block diagram showing the control system of the tape printer.

In FIG. 4, the tape printer 1 comprises a calculating device such as a CPU 212 that performs predetermined calculations.

The above described liquid crystal display 5, an EEPROM 214, a RAM 213, and the cartridge sensor 6 are connected to the CPU 212. The CPU 212 is connected to a power source circuit 215 that is connected to the AC adapter 220 and performs the ON/OFF processing of the power source of the tape printer 1, a motor driving circuit 216 that controls the driving of the drive motor 211 that drives the above described ribbon take-up roller driving shaft 107 and the above described feeding roller driving shaft 108, and the thermal head control circuit 217 that controls the energization of the heating elements of the above described thermal head 23.

Various control programs (including a print display program of this embodiment that executes the flow in FIG. 7 and the like described later) are stored in the EEPROM 214. The CPU 212 performs signal processing in accordance with a program stored in advance in the EEPROM 214 while utilizing a temporary storage function of the RAM 213, thereby controlling the entire tape printer 1.

The cartridge sensor 6 detects the above described detected part 6A suitably formed on the cartridge 8 mounted to the cartridge holder 9, or the like, by a known technique (such as a mechanical contact-type technique, or a non-contact type technique that uses a magnetic or optical technique, for example). The CPU 212 acquires type information of the cartridge 8 based on the detected result of this cartridge sensor 6. This type information includes at least tape width information of the above described cover film 103 and base tape 101 disposed in each of the cartridges 8.

Special characteristic of the embodiment In the above basic configuration, the special characteristic of this embodiment lies in automatic predetermined reduction processing performed when print objects spanning multiple lines are formed into print using the cartridge 8 comprising the cover film 103 having a relatively narrow tape width, the predetermined reduction processing being performed on the print objects of each line. In the following, the details will be described in order.

Print Object Size Specification

As described above, in the tape printer 1 of this embodiment, print desired by the operator is formed on the cover film 103 supplied from the cartridge 8. At this time, in this embodiment, the desired print objects (text characters, visual objects, or the like) that the operator intends to form into print are acquired by the CPU 212 via operation of an operating device such as the above described keyboard 3 and function key group 4, for example, and the sizes of the print objects at the time are specified (details described later) by the operator via operation of the above described keyboard 3 and function key group 4.

Background Required for Reduction Processing

The various cartridges 8 (that is, the cartridges 8 having various mutually different tape width sizes) are mounted to the cartridge holder 9 and used. At this time, the width of the cover film 103 supplied from the mounted cartridge 8 may be relatively narrow. In such as a case, when the size of the print object specified by the above described operator is relatively large, it becomes difficult to form the print object with that size on the cover film 103. In particular, if print objects spanning multiple lines are to be formed in the tape width direction, the possibility exists that the width of the cover film 103 will be inadequate, making print formation impossible.

Hence, in this embodiment, in such a case (when the width of the cover film 103 is insufficient and the print objects spanning multiple lines cannot be formed as is), predetermined reduction processing is automatically performed on each of the print objects spanning multiple lines (two lines in the example below; details described later). A plurality of modes (two in this example: "ratio priority mode" and "size priority mode") is disposed in advance as forms of this reduction processing. The ratio priority mode is a mode in which, when reduction processing is performed on print objects spanning two lines as described above, reduction is performed so that the size ratio of the print objects on each line is maintained (details described later). The size priority mode is a mode in which, when reduction processing is performed on print objects spanning two lines as described above, reduction is performed so that the size relationship between the print objects on each line is maintained (details described later).

Reduction Processing Based on Ratio Priority

First, the reduction processing in the above described ratio priority mode will be described using FIG. 5. Note that the following describes a case where the width of the cover film 103 is 18 [mm] and the maximum number of dots in the print area in the tape width direction is 128 [dots] as an example in this embodiment.

Figure 5:
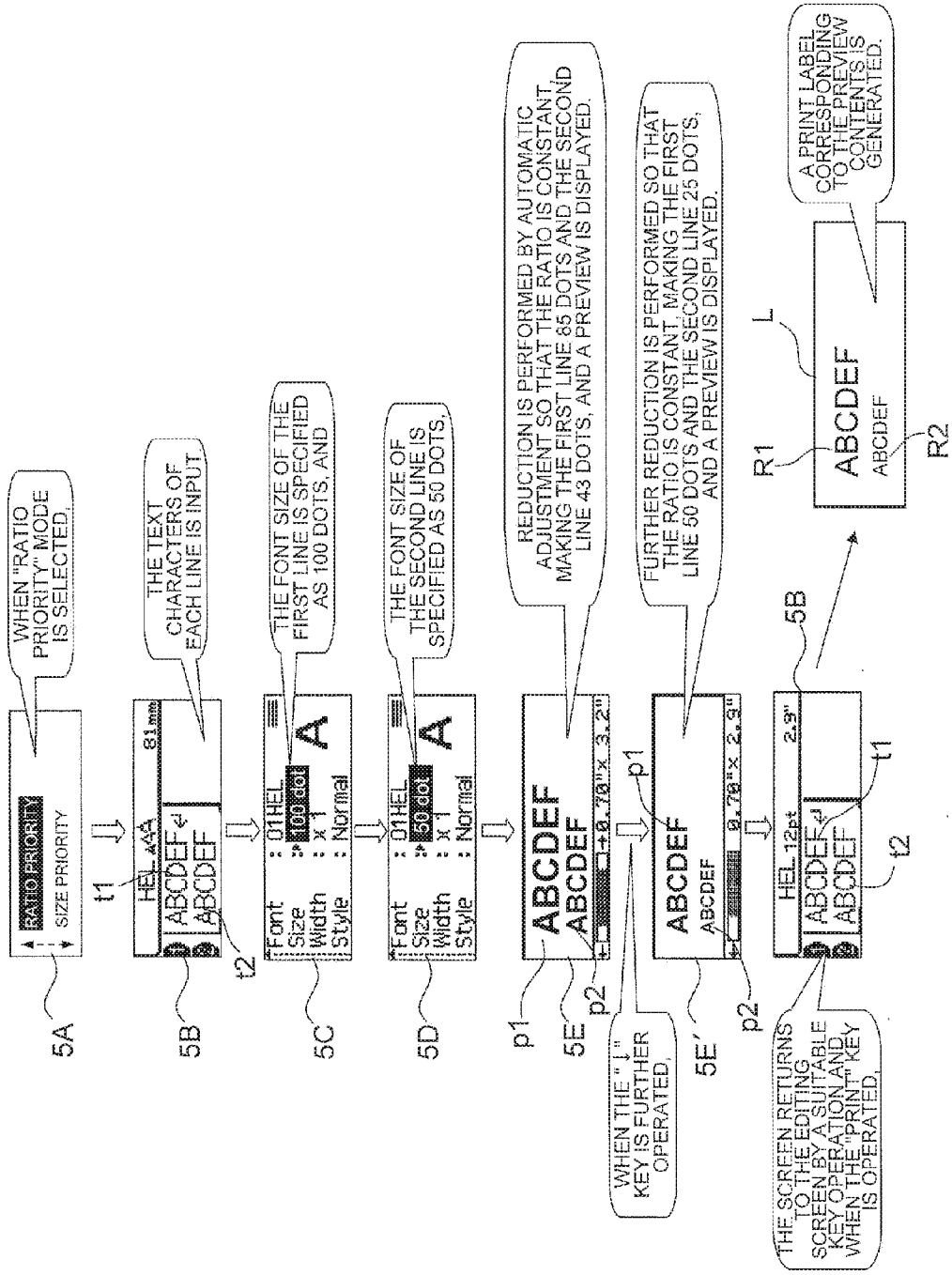
FIG. 5 is an explanatory view for explaining the transitions of the screen display and reduction process when ratio priority mode is selected.

First, as shown in FIG. 5, a mode selection screen 5A for selecting either the above described ratio priority mode or the above described size priority mode is displayed on the above described liquid crystal display 5. In this state, when "Ratio priority mode" is selected by a suitable operation using the above described keyboard 3 or the like, the screen transitions to a text editing screen 5B (a screen for inputting text characters and the like described later), as shown in FIG. 5. Note that, at this point in time, the tape width information of the cover film 103 of the cartridge 8 has already been acquired (by the CPU 212) based on a detection result of the above described cartridge sensor 6.

With the text editing screen 5B in FIG. 5 displayed, the operator inputs text characters, visual objects, and the like using the above described keyboard 3 and the like. In this example, a first print object t1 comprising the text characters "ABCDEF" and a second print object t2 comprising the text characters "ABCDEF" are input and displayed on a first line and a second line, respectively.

Subsequently, the screen transitions to a first object settings screen 5C shown in FIG. 5 by a suitable operation of the above described keyboard 3 or the like by the operator. This first object settings screen 5C is a screen for inputting and displaying various settings related to the first print object t1 on the above described first line. In this example, the operator suitably operates the above described keyboard 3 or the like, specifying a font size of the first print object t1 as 100 [dots].

Subsequently, the screen transitions to a second object settings screen 5D shown in FIG. 5 by a suitable operation of the above described keyboard 3 or the like by the operator. This second object settings screen 5D is a screen for inputting and displaying various settings related to the second print object t2 on the above described second line. In this example, the operator suitably operates the above described keyboard 3 or the like, specifying a font size of the second print object t2 as 50 [dots].

When specification of the font sizes of the two print objects t1, t2 is completed as described above, the specified font sizes of the first print object t1 and the second print object t2 and the tape width acquired as described above are compared to determine whether or not print formation according to the above described specified sizes is possible. At this time, the maximum number of dots in the print area of the cover film 103 in the tape width direction is 128 [dots] total, as described above. Thus, the 150-[dot] combined total of the 100-[dot] font size of the first print object t1 on the first line and the 50-[dot] font size of the second print object t2 on the second line exceeds the above described 128 maximum number of dots.

Hence, in accordance with the above described ratio priority mode setting, the above described first print object t1 and second print object t2 are each subjected to reduction processing by automatic adjustment while keeping the 100:50 size ratio thereof constant, as shown in FIG. 5. That is, in this example, while the first print object t1 is reduced to a size of 85 [dots], the second print object t2 is reduced to a size of 43 [dots]. As a result, the total number of dots of the two print objects t1, t2 becomes 128 [dots], which is less than or equal to the above described 128 maximum number of dots. A reduced image p1 of the first print object and a reduced image p2 of the second print object thus reduced are displayed in a preview on a preview screen 5E.

At this time, when the operator operates the above described "↓" cursor key disposed on the above described keyboard 3 with the intention of further reduction processing, the above described first print object t1 and second print object t2 are each subjected to further reduction processing by automatic adjustment while continually keeping the 100:50 size ratio thereof constant, as shown in FIG. 5. In this example, the first print object t1 is further reduced to a size of 50 [dots], and the second print object t2 is further reduced to a size of 25 [dots]. The reduced image p1 of the first print object and the reduced image p2 of the second print object thus reduced are displayed in a preview on a preview screen 5E'.

Subsequently, when the operator performs a suitable operation via the above described keyboard 3 or the like, the screen returns to the above described text editing screen 5B as shown in FIG. 5. In this state, the operator operates the above described print key 4C, thereby generating the print label L comprising a print R1 of "ABCDEF" having a relatively large size (equivalent to the above described 50 [dots]) and a print R2 of "ABCDEF" having a relatively small size (equivalent to the above described 25 [dots]) in accordance with the preview contents after the above described reduction processing, as shown in FIG. 5.

Reduction Processing Based on Size Priority

Next, the reduction processing in the above described size priority mode will be described using FIG. 6.

Figure 6:
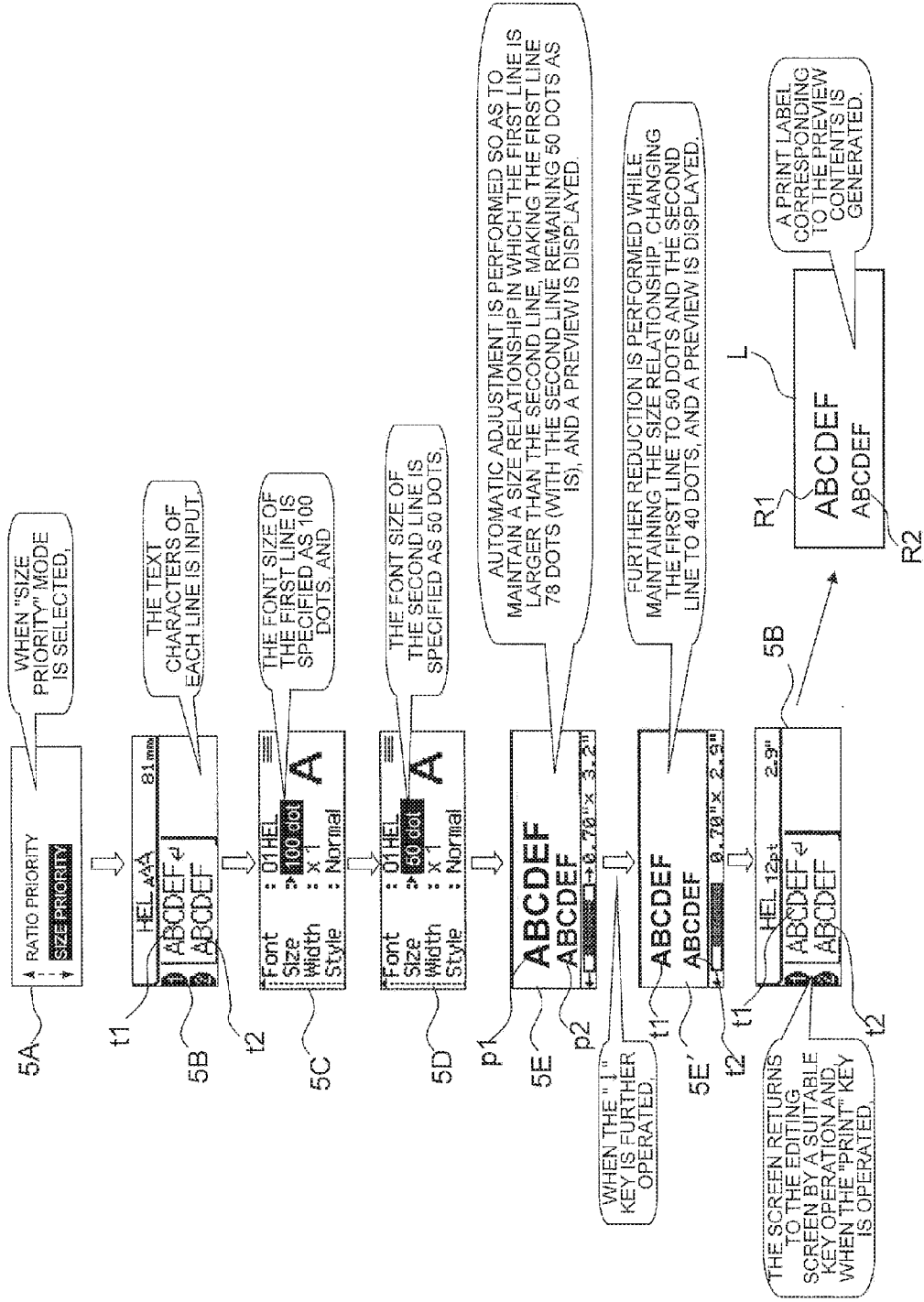
FIG. 6 is an explanatory view for explaining the transitions of the screen display and reduction process when size priority mode is selected.

First, as shown in FIG. 6, the mode selection screen 5A for selecting either the above described ratio priority mode or the above described size priority mode is displayed on the above described liquid crystal display 5, similar to the above described FIG. 5. In this state, when "Size priority mode" is selected by a suitable operation using the above described keyboard 3 or the like, the screen transitions to the above described text editing screen 5B, as shown in FIG. 6.

The input of the first print object t1 of "ABCDEF" and the second print object t2 of "ABCDEF" on the text editing screen 5B in FIG. 6, and the subsequent specification of the font sizes (100 [dots] and 50 [dots]) on the first object settings screen 5C and the second object settings screen 5D in FIG. 6 are the same as those in the aforementioned FIG. 5, and descriptions thereof will be omitted.

When specification of the font sizes of the two print objects t1, t2 is completed as described above, the specified font sizes of the first print object t1 and the second print object t2 and the tape width acquired as described above are compared to determine whether or not print formation according to the above described specified sizes is possible. The combined total (150 [dots]) of the 100-[dot] font size of the first print object t1 on the first line and the 50-[dot] font size of the second print object t2 on the second line is greater than the maximum number of dots (128 [dots] total) in the print area of the cover film 103 in the tape width direction, as described above. Thus, in accordance with the above described size priority mode setting, the above described first print object t1 and second print object t2 are each subjected to reduction processing by automatic adjustment while maintaining the size relationship therebetween (first print object>second print object), as shown in FIG. 6. That is, in this example, while the second print object t2 is maintained at 50 [dots] as is, the first print object t1 is reduced to a size of 78 [dots]. As a result, the total number of dots of the two print objects t1, t2 becomes 128 [dots], which is less than or equal to the above described 128 maximum number of dots. The reduced image p1 of the first print object and the reduced image p2 of the second print object thus reduced are displayed in a preview on the preview screen 5E.

At this time, similar to the above described FIG. 5, the operator operates the above described "↓" cursor key disposed on the above described keyboard 3 with the intention of further reduction processing, subjecting the above described first print object t1 and second print object t2 each to further reduction processing by automatic adjustment while continually maintaining the size relationship therebetween, as shown in FIG. 6. In this example, the first print object t1 is further reduced to a size of 50 [dots], and the second print object t2 is further reduced to a size of 40 [dots]. The reduced image p1 of the first print object and the reduced image p2 of the second print object thus reduced are displayed in a preview on the preview screen 5E'.

Subsequently, when the operator performs a suitable operation via the above described keyboard 3 or the like, the screen returns to the above described text editing screen 5B as shown in FIG. 6. In this state, the operator operates the above described print key 4C, thereby generating the print label L comprising the print R1 of "ABCDEF" having a relatively large size and the print R2 of "ABCDEF" having a relatively small size in accordance with the preview contents after the above described reduction processing, as shown in FIG. 6.

Control Procedure

Figure 7:
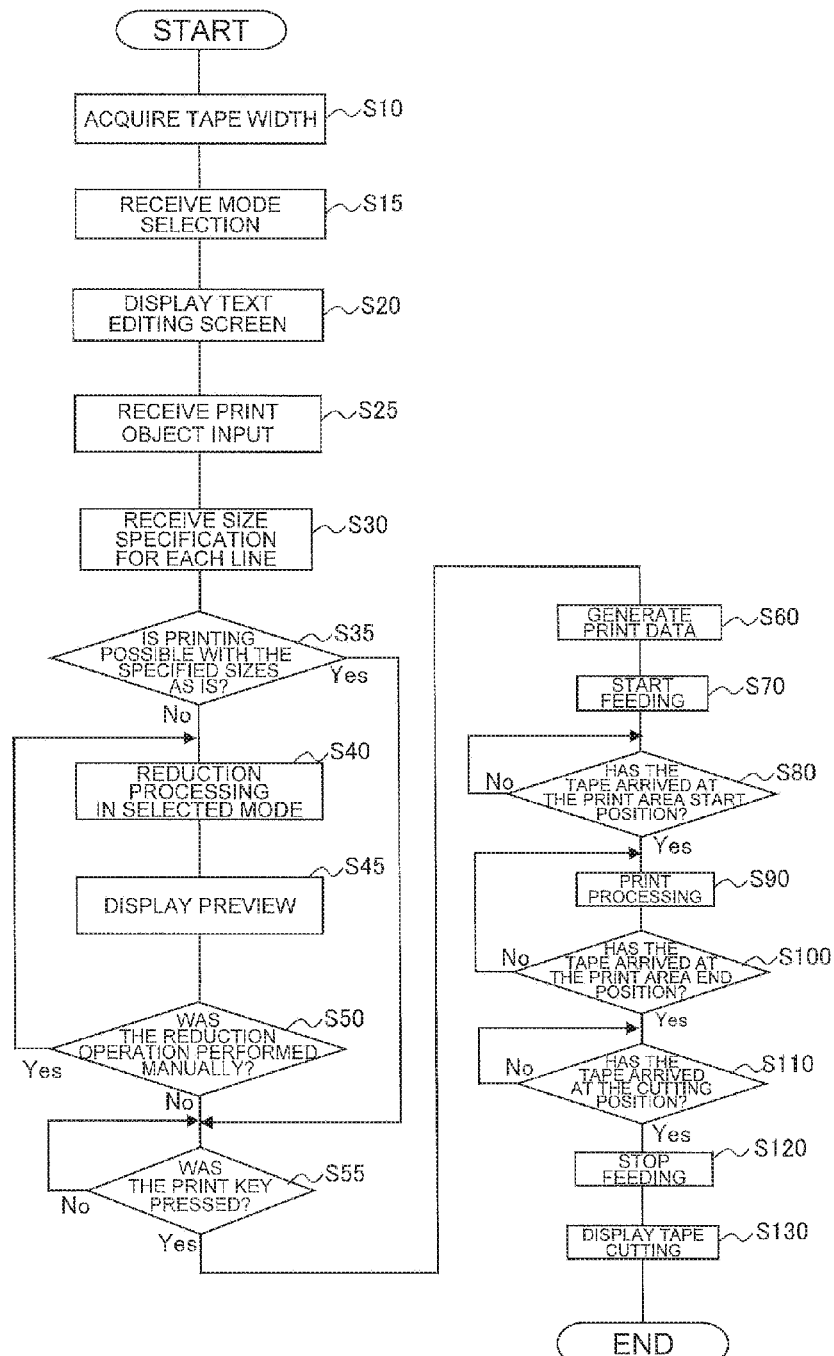
FIG. 7 is a flowchart showing the control procedure executed by the CPU.

FIG. 7 shows a flow indicating the processing procedure executed by the CPU 212 in order to achieve the technique described above.

In FIG. 7, the operator, for example, operates the above described power switch 4B of the above described function key group 4, thereby starting this flow.

First, in step S10, the CPU 212 acquires the tape width of the cover film 103 of the cartridge 8 mounted to the above described cartridge holder 9, based on a detection result of the above described cartridge sensor 6. That is, the cartridge sensor 6 detects the above described detected part 6A suitably formed on the cartridge 8 mounted to the cartridge holder 9, or the like, by a known technique (such as a mechanical contact-type technique, or a non-contact type technique that uses a magnetic or optical technique, for example). The CPU 212 acquires the type information of the cartridge 8 and the corresponding above described tape width based on the detected result of this cartridge sensor 6.

Subsequently, in step S15, the CPU 212 outputs a display signal to the above described liquid crystal display 5 to display the above described mode selection screen 5A, and receives the selection of either the "Ratio priority mode" or "Size priority mode" from the operator (refer to the above described FIG. 5 and FIG. 6).

Then, the flow proceeds to step S20 where the CPU 212 outputs a display signal to the liquid crystal display 5 and displays the aforementioned text editing screen 5B (refer to the above described FIG. 5 and FIG. 6).

Subsequently, the flow proceeds to step S25 where the CPU 212 receives an input operation of the above described first print object t1 and second print object t2 executed by the operator via the keyboard 3 (refer to the above described FIG. 5 and FIG. 6).

Subsequently, in step S30, the CPU 212 outputs a display signal to the liquid crystal display 5 and sequentially displays the above described first object settings screen 5C and second object settings screen 5D. Then, the CPU 212 receives the size specification (100 [dots] in the aforementioned example; refer to FIG. 5 and FIG. 6) when the above described first print object t1 is formed into print, and the size specification (50 [dots] in the aforementioned example; refer to FIG. 5 and FIG. 6) when the above described second print object is formed into print. That is, specifically, the above described size specifications are received as specifications of the number of dots in the tape width direction.

Subsequently, in step S35, the CPU 212 compares the tape width acquired in the above described step S10 and the sizes of the first print object t1 and the above described second print object t2 acquired in the above described step S30, and determines whether or not the above described first print object t1 and the above described second print object t2 can be formed into print according to the specified sizes on the cover film 103. Specifically, the CPU 212 compares the maximum number of dots in the print area corresponding to the tape width of the cover film 103 in the tape width direction acquired in the above described step S10 and the numbers of specified dots acquired in the above described step S30, and determines whether or not the first print object t1 and the above described second print object t2 can be formed into print according to the specified numbers of dots on the cover film 103. As described using the above described FIGS. 5 and 6, if the total of the sizes (total number of dots) of the first print object t1 and the above described second print object t2 exceeds the above described maximum number of dots in the above described print area in the above described tape width direction, the condition of this step S35 is not satisfied (S35: No), and the flow proceeds to step S40. On the other hand, if the total of the sizes (total number of dots) of the first print object t1 and the above described second print object t2 is within the above described maximum number of dots in the above described print area in the above described tape width direction, the condition of step S35 is satisfied (S35: Yes), and the flow proceeds to step S55 described later.

Then, in step S40, the CPU 212 performs the above described reduction processing in which at least one of the above described first print object t1 and the second print object t2 is automatically reduced in accordance with a magnification rule (ratio priority or size priority in the aforementioned example) of the mode selected in the above described step S15. Note that the above described magnification rule is stored in the above described EEPROM 214 in advance, for example.

In the example shown in the aforementioned FIG. 5, reduction (100 [dots]→85 [dots]) of the first print object t1 and reduction (50 [dots] →43 [dots]) of the second print object t2 are executed concurrently. Further, in the example shown in the aforementioned FIG. 6, reduction (100 [dots] →78 [dots]) of only the first print object t1 is executed.

Subsequently, in step S45, the CPU 212 generates and outputs a display signal for displaying a preview of the reduced image p1 of the first print object and the reduced image p2 of the second print object after the reduction processing in the above described step S40 to the liquid crystal display 5, and displays the above described reduced images p1, p2 on the preview screen 5E.

Then, in step S50, the CPU 212 determines whether or not there were further magnification instructions (operation of the "↓" cursor key in the aforementioned example) for the first print object or the second print object by a manual operation by the operator via the keyboard 3 or the like in response to the preview display in the above described step S45. If there were no above described magnification instructions, the condition of step S50 is not satisfied (S50: No) and the flow proceeds to step S55 described later.

On the other hand, if there were the above described magnification instructions in step S50, the condition of step S50 is satisfied (S50: Yes), the flow returns to the above described step S40, and the same procedure is repeated. That is, in step S40, at least one of the first print object t1 and the second print object t2 after the above described reduction processing is reduced in accordance with the aforementioned magnification rule (maintaining size ratio or size relationship) so as to become the size corresponding to the magnification instructions received in step S50.

In the example shown in the aforementioned FIG. 5, further reduction (85 [dots]→50 [dots]) of the first print object t1 and further reduction (43 [dots] →25 [dots]) of the second print object t2 are executed concurrently (so that the size ratio of the first print object t1 and the second print object t2 is constant). Additionally, in the example shown in the aforementioned FIG. 6, further reduction (78 [dots]→50 [dots]) of the first print object t1 and further reduction (50 [dots]→40 [dots]) of the second print object t2 are executed concurrently (so as to maintain the first print object t1>second print object t2 size relationship).

Then, in step S45, the CPU 212 further generates and outputs a display signal for displaying a preview of the reduced image p1 of the first print object and the reduced image p2 of the second print object after the reduction processing in the above described step S40 to the liquid crystal display 5, and displays the above described reduced images p1, p2 on the preview screen 5E'.

Subsequently, in step S55, the CPU 212 determines whether or not the above described print key 4C of the above described function key group 4 was pressed. If the print key 4C has not been pressed, the condition of step S55 is not satisfied (S55: No), and the flow loops and enters a standby state until the condition of step S55 is satisfied. If the print key 4C was pressed, the condition of step S55 is satisfied (S55: Yes), and the flow proceeds to step S60.

In step S60, the CPU 212 generates print data that energizes the heating elements of the above described thermal head 23 for executing print formation corresponding to the preview screen 5E (or 5E') executed in the above described step S45.

Subsequently, in step S70, the CPU 212 outputs a control signal to the motor driving circuit 216, causing the drive motor 211 to start the driving of the feeding roller driving shaft 108 and the ribbon take-up roller driving shaft 107. As a result, the feeding of the cover film 103, the base tape 101, and the label tape 109 with print (hereinafter suitably and simply "the cover film 103 and the like") is started.

Then, in step S80, the CPU 212 determines whether or not the cover film 103 and the like to be fed as described above were fed up to a start position of a predetermined print area (whether or not the cover film 103 and the like were fed up to a transport-direction position where the printing head 23 directly faces a front end of the print area), based on the print data generated in the above described step S60. This determination need only be made by using a suitable known technique, such as counting the number of pulses of the above described drive motor 211 comprising a stepping motor, for example. If the cover film 103 and the like have not been fed up to the start position of the print area, the condition of step S80 is not satisfied (S80: No), and the flow loops and enters a standby state until the condition of step S80 is satisfied. Once the cover film 103 and the like are fed up to the start position of the print area, the condition of step S80 is satisfied (S80: Yes), and the flow proceeds to step S90.

In step S90, the CPU 212 performs print processing that energizes the heating elements of the thermal head 23 based on the print data generated in step S60. With the arrangement, the ink of the ink ribbon 105 is transferred by the above described energized heating elements and print corresponding to the above described print data is formed on the cover film 103.

Subsequently, in step S100, the CPU 212 determines whether or not the cover film 103 and the like to be fed as described above were fed up to an end position of the print area (whether or not the cover film 103 and the like were fed up to a transport-direction position where the printing head 23 directly faces the rear end of the print area). This determination need only be made by using a known technique similar to the above as well. If the cover film 103 and the like have not been fed up to the end position of the print area, the condition of step S100 is not satisfied (S100: No), the flow returns to step S90, and the same procedure is repeated. Once the cover film 103 and the like have been fed up to the end position of the print area, the condition of step S100 is satisfied (S100: Yes), and the flow proceeds to step S110.

In step S110, the CPU 212 determines whether or not the fed cover film 103 and the like were fed up to a predetermined cutting position set further on the label rear end side than the print area based on the above described print data (whether or not the label tape 109 with print was fed up to the transport-direction position where the above described movable blade 41 directly faces the above described cutting position), based on the print data generated in the above described step S60. This determination need only be made by using a known technique similar to the above as well. If the cover film 103 and the like have not been fed up to the cutting position, the condition of step S110 is not satisfied (S110: No), and the flow loops and enters a standby state until the condition of step S110 is satisfied. Once the cover film 103 and the like are fed up to the cutting position, the condition of step S110 is satisfied (S110: Yes), and the flow proceeds to step S120.

In step S120, the CPU 212 outputs a control signal to the motor driving circuit 216, causing the drive motor 211 to stop the driving of the feeding roller driving shaft 108 and the ribbon take-up roller driving shaft 107. As a result, the feeding of the cover film 103, the base tape 101, and the label tape 109 with print stops.

Subsequently, in step S130, the CPU 212 outputs a display signal to the liquid crystal display 5. With the arrangement, a suitable display that prompts the operator to operate the cutter lever 7, activate the cutting mechanism 15, and cut the above described label tape 109 with print is executed on the liquid crystal display 5. The operator operates the cutter lever 7, thereby cutting the label tape 109 with print and generating the print label L on which the prints R1, R2 corresponding to the preview display in the above described step S45 are formed (refer to FIG. 5 and FIG. 6). Subsequently, this process terminates.

Advantages of the Embodiment

As described above, according to this embodiment, even if the tape width of the cover film 103 is relatively narrow and print formation according to the size specifications by the operator is not possible as is, both the first print object t1 and the second print object t2 can be reliably formed into print by reducing at least one of the first print object t1 and the second print object t2 (in a way that is in accordance with a form of the above described size specifications to a certain extent).

Further, in particular, according to this embodiment, it is possible to display the appearance (the above described reduced images p1, p2) of the reduced first print object t1 and the second print object t2 at the time of the above described reduction processing in advance prior to print formation, allowing the operator to visually check the appearance.

Further, in particular, according to this embodiment, after at least one of the first print object t1 and the second print object t2 is reduced according to the above described reduction processing, at least one of the first print object t1 and the second print object t2 is further reduced so as to become the size corresponding to the magnification instructions of the manual operation by the operator. Then, the appearance of the reduced first print object t1 and second print object t2 is displayed (the reduced images p1, p2 in the above described FIG. 5 and FIG. 6) in advance prior to print formation, allowing the operator to visually check the appearance. As a result, it is possible to further improve operator convenience.

Further, in particular, according to this embodiment, in ratio priority mode, the above described reduction processing is performed while maintaining the size ratio of the first print object t1 and the second print object t2. With the arrangement, it is possible to perform reduction processing while maintaining the size ratio of the first print object t1 and the second print object t2 originally intended by the operator.

Further, in particular, according to this embodiment, in size priority mode, the above described reduction processing is performed while maintaining the size relationship between the first print object t1 and the second print object t2. With the arrangement, it is possible to perform reduction processing while maintaining the size relationship between the first print object t1 and the second print object t2 originally intended by the operator.

Further, in particular, according to this embodiment, the operator selects a mode corresponding to his/her intended magnification rule (magnification that maintains the size ratio of the first print object t1 and the second print object t2, or magnification that maintains the size relationship between the first print object t1 and the second print object t2), thereby causing the above described reduction processing in accordance with the selected mode to be performed. As a result, it is possible to reliably execute a print formation form without significantly deviating from the original intentions of the operator.

Note that the present disclosure is not limited to the above described embodiment, and various modifications may be made without deviating from the spirit and scope of the disclosure. The following describes such modifications one by one.

(1) When Size is Specified Completely Manually after Automatic Reduction

While, in the above described embodiment, after the automatic reduction processing of the above described first print object t1 and the second print object t2 is completed, reduction processing in accordance with a manual operation (operation of the "↓" cursor key in the aforementioned example) by the operator is performed in accordance with the selected mode at that point in time, the present disclosure is not limited thereto.

That is, with the above described reduction processing completed (with the preview screen 5E in FIG. 5 and FIG. 6 displayed), specifications of the font size of the first print object t1 and the font size of the second print object t2 by a suitable operation of the above described keyboard 3 or the like by the operator, similar to that previously described in FIGS. 5 and 6, may be respectively received. Subsequently, the CPU 212 performs processing that further reduces either the first print object t1 or the second print object t2 after the above described reduction processing so that the font size becomes the received size. Then, the CPU 212 generates a display signal for displaying a preview of the first print object t1 and the second print object t2 after this reduction processing, and displays the preview on the liquid crystal display 5.

According to this modification, after reduction by the above described reduction processing, it is possible to further reduce the first print object t1 and the second print object t2 so that the sizes become any specified by the operator. As a result, it is possible to further improve operator convenience. Further, it is possible to display the appearance of the reduced first print object t1 and second print object t2 in advance prior to print formation, allowing the operator to visually check the appearance.

(2) When a New Mode can be Selected after Preview in the Reduced State

While, according to the above described embodiment, the mode selection is unchangeable in the various reduction processing performed after either of the above described two modes (ratio priority mode and size priority mode) is first selected, the present disclosure is not limited thereto. That is, once either mode is selected, the corresponding reduction processing is performed, and the result is previewed (refer to FIGS. 5 and 6), selection of a different mode may be newly received (a different function of the rule specification receiving process of the CPU 212). After the receipt, the same reduction processing as described above is performed according to the selected different mode.

According to this modification, after the above described reduction processing is initially performed according to the predetermined magnification rule (magnification rule based on ratio priority mode or size priority mode) on the first print object t1 and the second print object t2 and a preview is displayed, it is possible to newly perform further reduction processing using a different magnification rule. As a result, operator convenience can be further improved.

(3) Other

Note that while the above has described an illustrative scenario of a so-called stand-alone type tape printer 1, the present disclosure is not limited thereto. That is, with an operation terminal connected to the tape printer 1 that produces the print label L via a wired or wireless communication line, the same processing as the above described processing from step S10 to step S60 in FIG. 7 may be executed on the operation terminal side. In this case, a suitable print instruction is performed on the operation terminal in step S55, thereby transmitting print data generated in step S60 from the operation terminal to the tape printer 1 and executing the processing in step S70 and thereafter in FIG. 7 in the tape printer 1. In this case as well, the same advantages as described above are achieved.

Note that descriptions such as "orthogonal," "parallel," "planar," and the like in the above explanations are not made in a strict sense. That is, the terms "orthogonal," "parallel," and "planar" mean "substantially orthogonal," "substantially parallel," and "substantially planar," allowing design and manufacturing tolerances and differences.

Further, descriptions such as "identical," "equal," "different," and the like for outer appearance dimensions and sizes in the above explanations are not made in a strict sense. That is, the terms "identical," "equal," and "different" mean "substantially identical," "substantially equal," and "substantially different," allowing design and manufacturing tolerances and differences.

Note that descriptions such as "identical," "equal," "different," and the like for values that serve as predetermined criteria or discriminating values, such as threshold values and standard values, for example, are made in a strict sense, unlike the above.

Note that the arrows shown in each figure, such as FIG. 4, in the above denote an example of signal flow, but the signal flow direction is not limited thereto.

Also note that the present disclosure is not limited to the procedures shown in the above described flows of the flowcharts in FIG. 7, and procedure additions and deletions as well as sequence changes and the like may be made without deviating from the spirit and scope of the disclosure.

Further, other than that already stated above, techniques based on the above described embodiments and each of the modifications may be suitably utilized in combination as well.

What is claimed is:

1. A tape printer comprising:
   a feeder configured to feed a print-receiving tape;
   a printing head configured to form desired print on said print-receiving tape fed by said feeder;
   a cartridge holder configured to attach and detach a tape cartridge configured to supply said print-receiving tape; and
   a controller configured to control said feeder and said printing head;
   said controller being configured to execute:
   a tape width acquiring process for acquiring a tape width of said print-receiving tape disposed in said tape cartridge mounted to said cartridge holder;
   an object acquiring process for acquiring a first print object to be formed on a first line of said print-receiving tape in a tape width direction, and a second print object to be formed on a second line of said print-receiving tape in said tape width direction;
   a first specification receiving process for respectively receiving a specification of a first size for printing said first print object, and receiving a specification of a second size having a value that is different from a value of said first size for printing said second print object;
   a determining process for determining whether or not a print of said first print object and said second print object can be performed according to each of the specified sizes on said print-receiving tape, based on said specifications of said first size and said second size received by said first specification receiving process, and said tape width of said print-receiving tape acquired by said tape width acquiring process; and
   a first reduction process for reducing at least one of said first print object and said second print object in accordance with at least one preset magnification rule so that said print of said first print object and said second print object becomes possible in a case where said print according to said specified sizes is determined to be impossible by said determining process, wherein:

said first reduction process is a reduction process that maintains a size ratio of said first print object and said second print object as said magnification rule.

2. The tape printer according to claim 1, wherein:

said printing head that comprises a plurality of heating elements configured to be energized by control of said controller and forms print using dots, and align along said tape width direction of said print-receiving tape.

3. The tape printer according to claim 2, wherein:

in said first specification receiving process, a specification of a first number of dots in said tape width direction as said first size, and a specification of a second number of dots in said tape width direction as said second size are respectively received;

in said determining process, whether or not said first print object and said second print object can be printed according to each of the specified numbers of dots on said print-receiving tape is determined based on not only said specifications of said first number of dots and said second number of dots received by said first specification receiving process, but also a maximum number of dots in a print area of said print-receiving tape in the tape width direction wherein the tape width of said print-receiving tape is acquired by said tape width acquiring process; and in said first reduction process, at least one of said first print object and said second print object is reduced in the case that said print according to said specified number of dots is determined to be impossible by said determining process.

4. The tape printer according to claim 1, wherein:

said controller is configured to further execute a first display signal generating process for generating a first display signal for displaying a preview display of said first print object and said second print object after said first reduction process.

5. The tape printer according to claim 4, wherein:

said controller is configured to further execute:

a magnification instruction receiving process for receiving a magnification instruction with respect to said first print object or said second print object by a manual operation corresponding to said preview display based on said first display signal;

a second reduction process for reducing at least one of said first print object and said second print object after said first reduction process in accordance with said magnification rule so that the size of the at least one of said first print object and said second print object becomes a size corresponding to said magnification instruction received by said magnification instruction receiving process; and a second display signal generating process for generating a second display signal for displaying a preview display of said first print object and said second print object after said second reduction process.

6. The tape printer according to claim 5, wherein:

said controller is configured to further execute:

a second specification receiving process for receiving a specification of said first size for said first print object or said second size for said second print object by a manual operation corresponding to said preview display based on said first display signal;

a third reduction process for reducing at least one of said first print object after said first reduction process so that the size of the at least one of said first print object and said second print object becomes a size received by said second specification receiving process; and a third display signal generating process for generating a third display signal for displaying a preview display of said first print object and said second print object after said third reduction process.

7. The tape printer according to claim 6, wherein:

said third reduction process is a reduction process for reducing at least one size ratio of said first print object and said second print object after said first reduction process in accordance with said magnification rule.

8. The tape printer according to claim 6, wherein:

said third reduction process is a reduction process for reducing at least one size relationship between said first print object and said second print object after said reduction process in accordance with said magnification rule.

9. The tape printer according to claim 6, wherein:

said controller is configured to further execute a rule specification receiving process for receiving a specification selecting one of a plurality of said magnification rules set in advance as the preset magnification rule; and in said third reduction process, reduction processing is performed according to said one magnification rule corresponding to the specification received by said rule specification receiving process.

10. The tape printer according to claim 5, wherein:

said second reduction process is a reduction process that maintains a size ratio of said first print object and said second print object as said magnification rule.

11. The tape printer according to claim 5, wherein:

said second reduction process is a reduction process that maintains a size relationship between said first print object and said second print object as said magnification rule.

12. The tape printer according to claim 5, wherein:

said controller is configured to further execute a rule specification receiving process for receiving a specification selecting one of a plurality of said magnification rules set in advance as the preset magnification rule; and in said second reduction process, reduction processing is performed according to said one magnification rule corresponding to the specification received by said rule specification receiving process.

13. The tape printer according to claim 1, wherein:

said magnification rule is stored in memory.

14. A tape printer comprising:

a feeder configured to feed a print-receiving tape;

a printing head configured to form desired print on said print-receiving tape fed by said feeder;

a cartridge holder configured to attach and detach a tape cartridge configured to supply said print-receiving tape; and a controller configured to control said feeder and said printing head;

said controller being configured to execute:

a tape width acquiring process for acquiring a tape width of said print-receiving tape disposed in said tape cartridge mounted to said cartridge holder;

an object acquiring process for acquiring a first print object to be formed on a first line of said print-receiving tape in a tape width direction, and a second print object to be formed on a second line of said print-receiving tape in said tape width direction;

a first specification receiving process for respectively receiving a specification of a first size for printing said first print object, and receiving a specification of a second size having a value that is different from a value of said first size for printing said second print object;

a determining process for determining whether or not a print of said first print object and said second print object can be performed according to each of the specified sizes on said print-receiving tape, based on said specifications of said first size and said second size received by said first specification receiving process, and said tape width of said print-receiving tape acquired by said tape width acquiring process;

a first reduction process for reducing at least one of said first print object and said second print object in accordance with at least one present magnification rule so that said print of said first print object and said second print object becomes possible in a case where said print according to said specified sizes is determined to be impossible by said determining process; and a rule specification receiving process for receiving a specification selecting one of a plurality of said magnification rules set in advance as the preset magnification rule; wherein in said first reduction process, reduction processing is performed according to said one magnification rule corresponding to the specification received by said rule specification receiving process.

15. The tape printer according to claim 14, wherein:

in said rule specification receiving process, a new specification related to said magnification rule is received after generation of said first display signal for said preview display by said first display signal generating process.

16. A non-transitory computer-readable recording medium storing a print display program for executing steps on a calculating device of a tape printer that comprises a cartridge holder configured to attach and detach a tape cartridge configured to supply a print-receiving tape, said calculating device, a display device, and an operating device, and is configured to form desired print on said print-receiving tape, said steps comprising:

a tape width acquiring step for acquiring a tape width of said print-receiving tape disposed in said tape cartridge mounted to said cartridge holder;

an object acquiring step for acquiring a first print object to be formed on a first line of said print-receiving tape in a tape width direction, and a second print object to be formed on a second line of said print-receiving tape in said tape width direction, in accordance with an operation input to said operating device;

a first specification receiving step for respectively receiving a specification of a first size when said first print object is printed, and a specification of a second size having a value that is different from a value of said first size when said second print object is printed, via said operating device;

a determining step for determining whether or not a print of said first print object and said second print object can be performed according to each of the specified sizes on said print-receiving tape, based on said specifications of said first size and said second size received in said first specification receiving step, and said tape width of said print-receiving tape acquired in said tape width acquiring step;

a first reduction processing step for reducing at least one of said first print object and said second print object in accordance with at least one preset magnification rule so that said print of said first print object and said second print object becomes possible, in a case where said print according to said specified sizes is determined to be impossible in said determining step; and a display step for displaying a preview display of said first print object and said second print object after said first reduction process in said first reduction processing step, on said display device, wherein said first reduction processing step is a reduction processing step for maintaining a size ratio of said first print object and said second print object as said magnification rule.

17. A non-transitory computer-readable recording medium storing a print display program for executing steps on a calculating device of a tape printer that comprises a cartridge holder configured to attach and detach a tape cartridge configured to supply a print-receiving tape, said calculating device, a display device, and an operating device, and is configured to form desired print on said print-receiving tape, said steps comprising:

a tape width acquiring step for acquiring a tape width of said print-receiving tape disposed in said tape cartridge mounted to said cartridge holder;

an object acquiring step for acquiring a first print object to be formed on a first line of said print-receiving tape in a tape width direction, and a second print object to be formed on a second line of said print-receiving tape in said tape width direction, in accordance with an operation input to said operating device;

a first specification receiving step for respectively receiving a specification of a first size when said first print object is printed, and a specification of a second size having a value that is different from a value of said first size when said second print object is printed, via said operating device;

a determining step determining whether or not a print of said first print object and said second print object can be performed according to each of the specified sizes on said print-receiving tape, based on said specifications of said first size and said second size received in said first specification receiving step, and said tape width of said print-receiving tape acquired in said tape width acquiring step;

a first reduction processing step for reducing at least one of said first print object and said second print object in accordance with at least one preset magnification rule so that said print of said first print object and said second print object becomes possible, in a case where said print according to said specified sizes is determined to be impossible in said determining step;

a display step for displaying a preview display of said first print object and said second print object after said first reduction process in said first reduction processing step, on said display device; and a rule specification receiving processing step for receiving a specification selecting one of a plurality of said magnification rules set in advance as the preset magnification rule, wherein in said first reduction processing step, reduction processing is performed according to said one magnification rule corresponding to the specification received in said rule specification receiving processing step.

* * * * *